US005515236A

United States Patent [19]

Nolan et al.

[11] Patent Number: 5,515,236

[45] Date of Patent: May 7, 1996

[54] MOTOR CONTROL CENTER UNIVERSAL ELECTRICAL CONNECTOR

[75] Inventors: Kevin F. Nolan, Hillsborough; Valerie R. Padilla, Durham; Richard E. Bernier; Gilbert A. Soares, both of Mebane, all of N.C.

[73] Assignee: General Electric Company, New York, N.Y.

[21] Appl. No.: 339,668

[22] Filed: Nov. 14, 1994

[51] Int. Cl.$^6$ .......... H02B 1/10

[52] U.S. Cl. .......... 361/652; 174/68.2; 361/673; 439/115; 439/230

[58] Field of Search .......... 439/115, 207, 439/210, 212–214; 174/68.2, 70 B, 71 B, 88 B, 72 B; 361/611, 614, 624, 634, 637, 641, 648, 650, 652, 673

[56] References Cited

U.S. PATENT DOCUMENTS

| | | | |
|---|---|---|---|
| 2,786,152 | 3/1957 | Fisher | 307/147 |
| 4,001,653 | 1/1977 | Olashaw | 361/611 |
| 4,093,970 | 6/1978 | M'Sadoques | 361/650 |
| 4,672,501 | 6/1987 | Bilac et al. | |
| 4,720,769 | 1/1988 | Raabe | 361/634 |
| 5,149,277 | 9/1992 | Lemaster | 439/207 |
| 5,274,528 | 12/1993 | Noschese | 361/637 |
| 5,414,590 | 5/1995 | Tajali | 361/648 |

*Primary Examiner*—Gerald P. Tolin
*Attorney, Agent, or Firm*—Richard A. Menelly

[57] ABSTRACT

A universal electrical connector is incorporated into the electric power distribution network of a motor control center to connect the main circuit breaker with the control center vertical bus conductors and the branch circuit breakers. The connector in the form of a single metal casting is configured to connect the main circuit breaker with the control center internal electrical distribution conductors without requiring additional connectors.

8 Claims, 2 Drawing Sheets

26 14 22 24 25 12 12A 31 32 35 36 47 23 33 46 45 42 30 40 44 48 34 43 37 29 39 41 38 27A 27 28

MOTOR CONTROL CENTER UNIVERSAL ELECTRICAL CONNECTOR

BACKGROUND OF THE INVENTION

The present invention relates to motor control centers, such as described in co-pending U.S. patent applications Ser. No. 08/339,66 filed Nov. 14, 1994 entitled "Electrical Port Safety Guard Mechanism" and Ser. No. 08/339,899 filed Nov. 14, 1994 entitled "Modular Motor Control Center Assembly". In such motor control centers, three phase electric power is fed from the electric power distribution system mains to the control center through a so-called "main" circuit breaker within the control center. The internal electric power is fed from the main circuit breaker to the control center electrical components through horizontal and vertical main bus conductors and then through electrically-insulated vertical distribution bus conductors hereinafter "vertical risers" to the internal electrical components as described within the aforementioned U.S. patent application Ser. No. 08/339,661

Electrical connection between the main vertical bus conductors, the main circuit breaker and the vertical risers has heretofore required several custom connectors that required substantial assembly time since tolerance build-up between the separate conductors had to be carefully controlled. Since the custom connectors were fabricated from heavy copper bars that were usually tin or silver plated, the cost of such custom connectors added to the overall cost of the load center product.

One purpose of this invention is to provide a universal multi-connector unit that will inter-connect the main circuit breaker, main vertical bus conductors and vertical risers without requiring any additional electrical connector components.

SUMMARY OF THE INVENTION

In accordance with the present invention, there is provided a universal multi-connector unit cast from a single copper bar. The bar defines an off-set end that aligns with the corresponding end of the vertical riser and a base portion that includes a hollow cylindrical extension that is received within a corresponding cylindrical opening formed in the rear surface of the load end of the main circuit breaker.

DESCRIPTION OF THE PREFERRED EMBODIMENT

Figure 1:
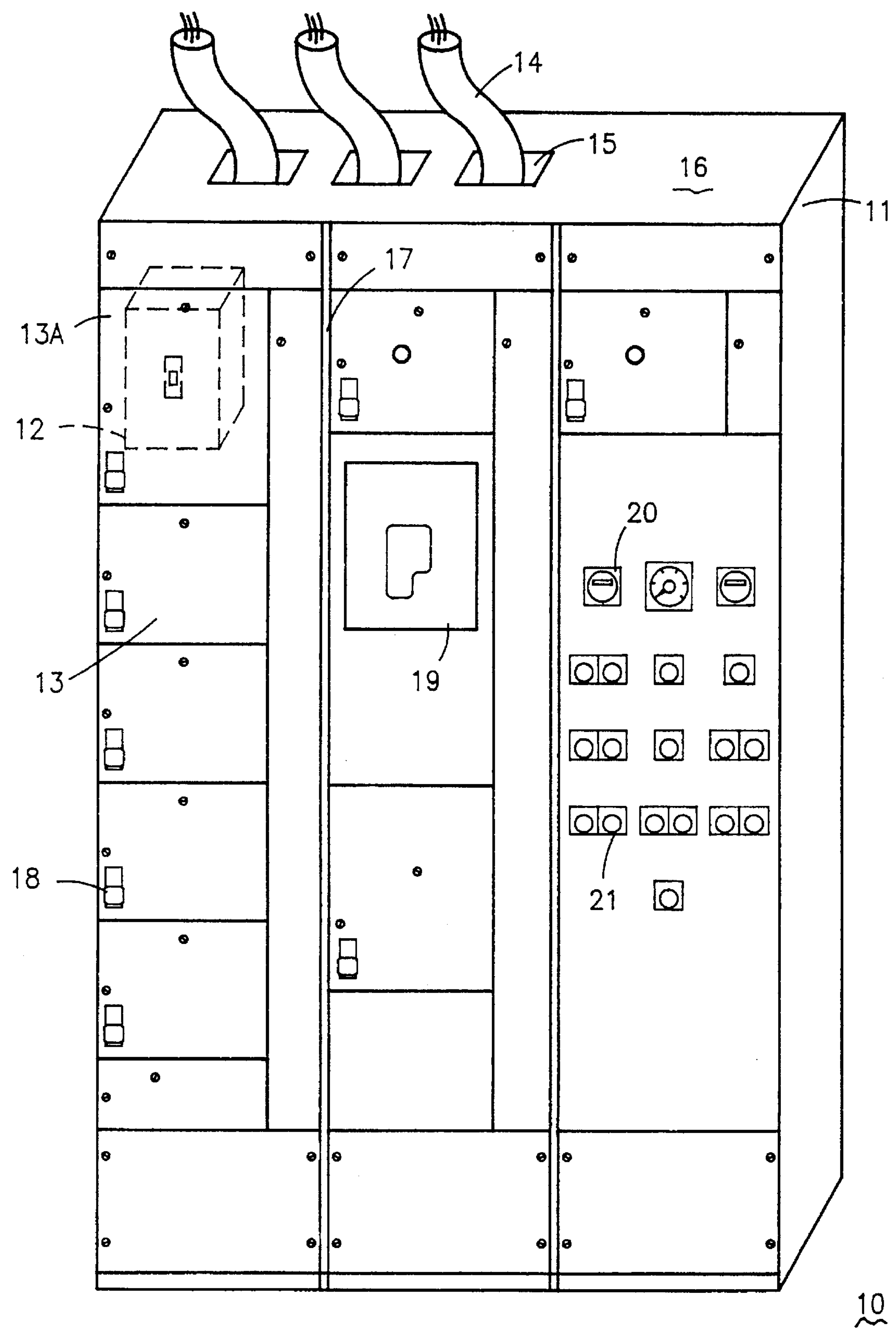
FIG. 1 is a front perspective view of an electric motor control center employing the multi-connector unit according to the invention.

A standard motor control center 10, as shown in FIG. 1, consists of a metallic enclosure 11 that houses a plurality of electrical components such as branch circuit breakers, contactors and transformers contained within compartments, one of which is indicated at 13. Corresponding handle operators 18 are arranged through each of the individual compartments. Meters 20 along with indicator lamps 21 provide indication of the electrical state of the various components without requiring access to the interior of the enclosure. A control unit 19, such as described within U.S. patent No. 4,672,501 entitled "Circuit Interrupter and Control Unit" is used to provide both control as well as communication function between the internal electrical components and the external electrical distribution system that includes the corresponding electric motors. In accordance with the teachings of the invention, a main circuit breaker 12 contained within the first compartment 13A electrical connects with the incoming power cables 14 that enter the top 16 of the enclosure 11 through openings 15.

Figure 2:
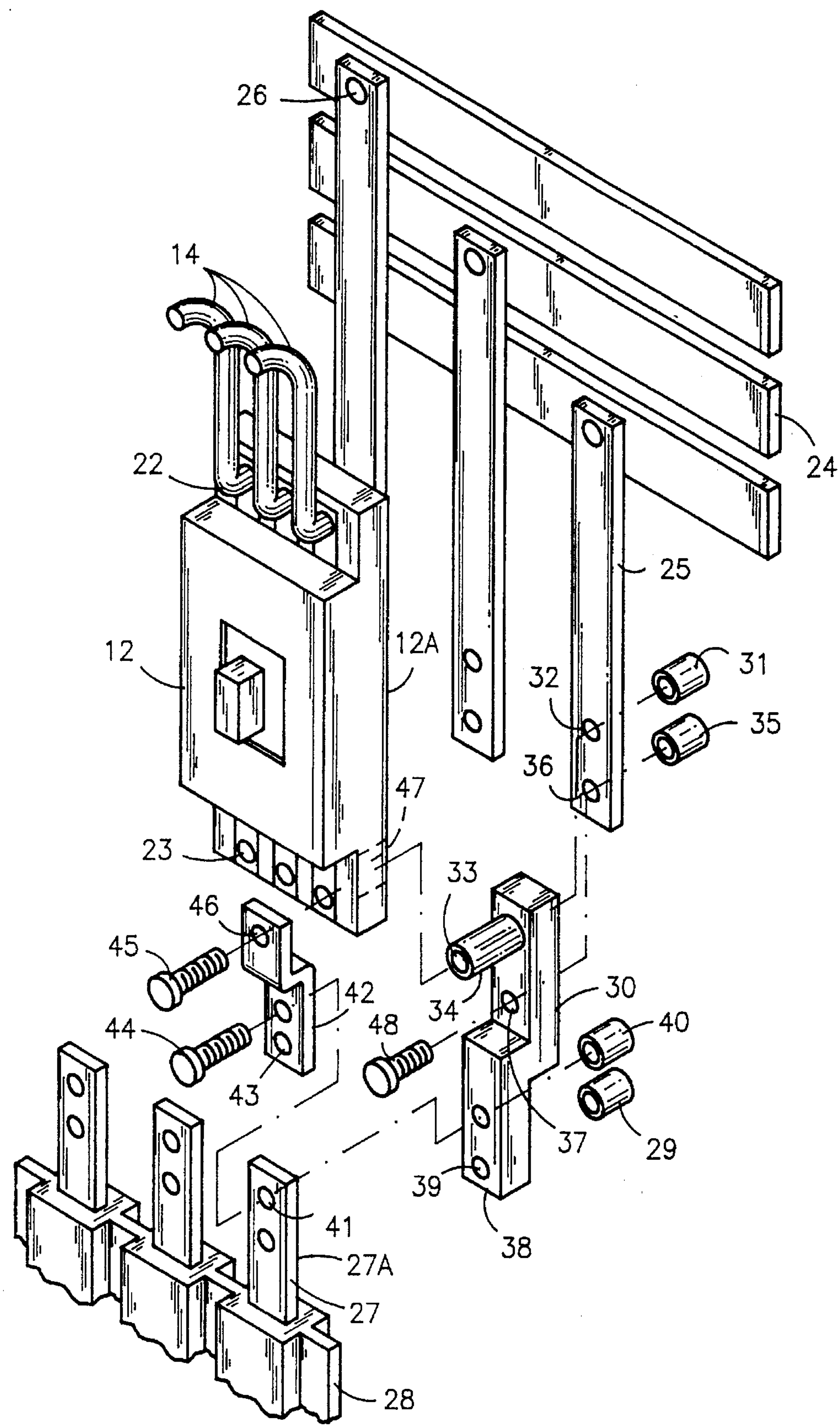
FIG. 2 is a front perspective view of the main circuit breaker, main bus bar conductors and multi-connector unit in isometric projection.

The main circuit breaker 12, described earlier, is shown in FIG. 2, connecting with the electrical distribution system power cables 14 by means of the circuit breaker line terminals 22 within the interior of the first compartment 13A. The main horizontal bus conductors 24 are bolted to the main vertical bus conductors 25 as indicated at 26. The multiple connector unit 29 is depicted prior to connecting between the main vertical buses, main circuit breaker 12 and the vertical risers 27 that were described in the aforementioned U.S. patent application Ser. No. 08/339,661 as covered with an electrically-insulating shield 28. Electrical connection with the load terminals 23 on the circuit breaker 12 is made by inserting the cylinder 34, having an extended passage 33 and up-standing from the rectangular base 30 on the multi-connector unit 29, within a corresponding cylindrical opening 47 formed within the back surface of the circuit breaker case 12A under the load terminals. An extended press nut 31 is inserted within the cylinder thru-hole 33 and within a thru-hole 46 on the one end of the angulated strap 42 and is attached by means of the bolt 45. A separate nut 35 is inserted within the thru-hole 36 on the vertical bus conductor 25 and is fastened to the base of the multi-connector unit by means of the thru-hole 37 and bolt 48. The ends 27A of the vertical risers 27 are sandwiched between the other end of the angulated strap 42 and the stepped end 38 on the multi-connector unit 29 that is off-set from the base 30. Nuts 40 are inserted within the thru-holes 39,43 and 41 and are fastened by means of bolts 44. It is noted that a small number of components are required to make the electrical connections that would otherwise require separate-connectors and bolts for each of the points of electrical connection described herein.

Accordingly, a multi-connector unit has herein been described that allows for a substantial reduction in components and assembly time for assembling and disassembling the main circuit breaker from the motor control center internal electrical distribution conductors with a corresponding savings in cost.

We claim:

1. A motor control center comprising:

an enclosure;

a compartment containing a main circuit breaker within said enclosure, said main circuit breaker including a main circuit breaker base;

first electrical conductors within said enclosure connected with said main circuit breaker;

second electrical conductors connected with said main circuit breaker and said first electrical conductors, said second electrical conductors being arranged within said enclosure for providing electrical current to electrical components contained within said enclosure; and a multi-connector unit within said enclosure said multi-connector unit defining a unitary metal structure comprising a base having a cylinder extending from one end connecting with said main circuit breaker and a stepped platform at an opposite end of said base, said base including first means attached to said first electrical conductors and said stepped platform including second means attached to said second electrical conductors, said cylinder being inserted within a passage formed within said main circuit breaker base.

2. The motor control center of claim 1 including third electrical conductors connecting with said first electrical conductors within said enclosure.

3. The motor control center of claim 1 wherein said second electrical conductors comprise vertical risers.

4. The motor control center of claim 1 wherein said first electrical conductors comprise bus bars.

5. The motor control center of claim 1 wherein said cylinder includes an extended passage from one end of said cylinder to an opposite end thereof.

6. The motor control center of claim 1 wherein said circuit breaker a base has a cylindrical recess formed therein.

7. The motor control center of claim 8 wherein said circuit breaker base further includes a load terminal on a surface of said base opposite said cylindrical recess.

8. The motor control center of claim 3 wherein said vertical risers comprise electrically-insulated electrical conductors.

* * * * *